3,630,896
AGRICULTURAL CHEMICAL COMPOSITION IN SOLID OR JELLY FORM
Hideto Oka, 275-1 Karasawa, Fujisawa-shi, Kanagawa, Japan, and Eiichiro Nakatsuka, 23-15 Kohinata 1-chome, Bunkyo-ku, Tokyo, Japan
No Drawing. Filed July 11, 1969, Ser. No. 841,150
Claims priority, application Japan, July 12, 1968, 43/48,724
Int. Cl. A01n 9/00; B01j 13/00; C09k 3/00
U.S. Cl. 252—1                                    1 Claim

ABSTRACT OF THE DISCLOSURE

The present invention relates to an agricultural chemical solidified or jellied by adding an appropriate amount of dibenzalsorbitol, monobenzalsorbitol or tribenzalsorbitol to an organic agricultural chemical which is liquid, as it is, or in a liquid state by dissolving said chemical in a solvent. The agricultural chemical may be a germicide, nematocide, insecticide or herbicide.

---

This invention relates to agricultural chemical consisting, as a main ingredient, of a natural or synthetic organic agricultural chemical which is liquid (including the chemical which is liquid, as it is, and which is liquefied by dissolving in a solvent; hereinafter the same).

The natural or synthetic organic agricultural chemicals commonly employed at present include, for example, nicotin, derris and insect flower preparations as the natural chemicals, and the chlorine agent such as DDT, chloropicrin, formalin and the like, the phosphorus agent such as parathion, DDVP and the like, and synthetic pyrethrins as the synthetic chemicals, as well as the agricultural chemical used as an organic fumigant, but the most of the chemicals are harmful to the human being and the domestic animals and further possess the untoward properties such as irritative odor and skin inflammation when brought into contact with the skin, and inflammability. Also, some of the chemicals which are solid in normal state are often sold and used in a liquid state for use by spraying. The handling of the agricultural chemical in liquid state is very troublesome because the chemical splashes over the operator during its handling. Also, the liquid chemicals are cumbersome in packaging and sometimes cause the great deal of damage by the accident in the transportation or handling. In particular, the agricultural chemical which easily volatilizes usually generates a toxic gas during its handling and spraying thereby causing the problems on the public nuisance.

This invention concerns to facilitate the handling of the organic agricultural chemicals having the above properties and to minimize the damage brought about by such agricultural chemicals and is characterized by solidifying or jellying the organic agricultural chemicals in the liquid state by adding an appropriate amount of dibenzalsorbitol or a derivative thereof to said liquid agricultural chemicals.

As described above, the agricultural chemical used as the main ingredient in the present invention is a natural or synthetic organic agricultural chemical which is liquid, as it is, or liquefied by dissolving in an appropriate solvent such as an organic solvent, water or the like. That is, the agricultural chemical in a solid state can also be used when it is liquefied by dissolving it in the solvent. Among the above described nicotin, derris, insect flower, DDT, chloropicrin, formalin, parathion, DDVP, synthetic pyrethrin preparations and the agricultural chemicals used as organic fumigants, those in the liquid state are preferably used in the present invention.

The process for solidifying or jellying the main ingredient, i.e., a liquid organic agricultural chemical by adding an appropriate amount of dibenzalsorbitol or a derivative thereof can preferably be carried out in the following manner: An appropriate amount of dibenzalsorbitol or a derivative thereof is added to the liquid agricultural chemical, and the mixture is then heated with stirring to dissolve the gelling agent (dibenzalsorbitol or a derivative thereof), or, alternatively, a highly concentrated solution of an appropriate amount of dibenzalsorbitol or a derivative thereof dissolved in a solvent is prepared and added to the liquid agricultural chemical used as a main ingredient, and the mixture is stirred at normal temperature and thereafter allowed to stand for a while. In either case, the liquid organic agricultural chemical is gelled thereby yielding a solid or jellied preparation. As the dibenzalsorbitol derivatives, an agent, for example, monobenzalsorbitol or tribenzalsorbitol can preferably be used in the present invention. The preferred amount of the dibenzalsorbitol and a derivative thereof to be added depends upon the kinds of the derivatives, the agricultural chemicals to be gele ldand, in particular, the solvents and, therefore, is not specifically mentioned. For example, when chloropicrin, formalin or DDVP is used as an agricultural chemical, dibenzalsorbitol as a gelling agent is preferably used in an amount of 4 to 7% (by weight; hereinafter the same unless otherwise indicated), 10 to 30% or 4 to 7%, respectively, based on the amount of the agricultural chemical. In addition, the characteristics of the resulting agricultural chemicals can be varied from a solid state to a jelly state by adjusting the amount of dibenzalsorbitol or its derivative within the above preferred range. If the agricultural chemical thus obtained is semitransparent agar-like, it can then be aged by allowing it to stand for 5 to 24 hours and thereafter jellied by stirring or blending at a high rate by means of a homomixer or an inkroll.

The agricultural chemicals solidified or jellied in accordance with the present invention do not splash the liquid chemicals during their handling and, moreover, they retard the volatilization of the chemicals which easily volatilize in the liquid state, whereby the generation of a toxic, irritative or inflammable gas can be minimized. The above facts make the agricultural chemicals more safe, and the chemicals can be packed in bags by utilizing a simple manner and transported easily. Also, the possibility of the injury caused by accident in the transportation and handling is significantly reduced and, at the same time, the public nuisance is dissolved.

The organic fumigant is a preparation in which a number of synthetic resin bags, which are packed with the agricultural chemical, is packaged in a container together with an ignition aid, and, when the burner of the fumigant is ignited, the ignition aid fires first so that the bags packed with the agricultural chemical is heated thereby gasifying the chemical. The prior art fumigant uses the liquid chemical, and, therefore, the handling, in particular, the packing of such liquid chemical in bags is very troublesome. Also, when the conventional fumigant is ignited through the ignition aid upon use, the vapour is generated irregularly since the agricultural chemicals flow out all at once from the broken bags and gasified instantaneously. On the other hand, in the fumigant containing the agricultural chemicals according to the present invention, the agricultural chemicals are easily handled during the manufacture, and the generation of vapour can be regulated since the agricultural chemicals do not flow out all at once and are heated and gasified slowly. The dibenzalsorbitol or a derivative thereof used as a gelling agent in the present invention does not contain inorganic substances in contrast to the commonly gelling agents which comprise, for example, an organic bentonite or a metallic soap such as aluminum stearate, and, therefore, neither reduces the efficacy of the agricultural chemicals nor adversely affects the plants. Also, the agricultural chemicals solidified or jellied by utilizing dibenzalsorbitol or a derivative thereof do not show any vscosity but show the plastic flow and can easily be handled since they exhibit so-called thixotropic fluidity.

The present invention is further illustrated by the following examples, but these examples are not construed to limit the scope of this invention.

EXAMPLE 1

5 ml. of chloropicrin was placed in a test tube, and a 20% solution of dibenzalsorbitol in DMF (dimethylformamide) was dropped stepwise into the test tube through a pipette. The solution was added while stirring in the amount of 40 drops or 0.722 ml. in the first step and 10 drops in each of the successive three steps; the total amount of the solution added being 50 drops or 0.903 ml. after the second step, 60 drops or 1.083 ml. after the third step and 70 drops or 1.264 ml. after the fourth step. In this case, the gelation of chloropicrin was not completed in the second step and was completed in the third step. In the fourth step, the 20% solution of dibenzalsorbitol in DMF added after the third step remained as a liquid. The gelled chloropicrin obtained from the third step was of agar-like semitransparent.

The same gelled chloropicrin as that obtained in the third step was then aged by allowing it to stand for 15 hours and thereafter stirred at high rate by means of a homomixer to give a jellied agricultural chemical consisting of chloropicrin as a main ingredient.

The agricultural chemicals obtained above retard the generation of toxic gases and is easy to handle since the person who handles the chemical does not suffer from an attachment of the splash of the chemical to the skin. Also, the jellied chemical can be packed in bags thereby making the packaging and the transportation easy. The agricultural effect of conventional liquid chloropicrin is exhibited over a relatively short period of time and is not sustained, whereas the efficacy of the jellied chloropicrin obtained in the above example is exhibited gradually and sustained for a long period of time.

EXAMPLE 2

A 25% solution of dibenzalsorbitol in DMF was added dropwise with stirring to DDVP (dimethyldichlorovinyl phosphate), and the addition was stopped when the concentration of the gelling agent reached 2–5% based on the amount of DDVP. Upon allowing to stand or forcing to cool, the mixture was gelled and solidified gradually. The resulting gelled agricultural chemical showed the comparable effect with that of the gelled chemical obtained in Example 1.

In the same manner, a diluted solution of DDVP in an organic solvent (for example, xylene, toluene or the like) can be solidified.

EXAMPLE 3

37% formalin, and mixed solutions of formalin diluted with ethylene glycol monoethyl ether having concentrations of 10, 20 and 30% formalin were separately added dropwise to in the predetermined amount to a 29% solution of dibenzalsorbitol in DMF, and percent gelation in each mixture was measured after allowing the mixture to stand for 24 hours. The results were as shown in table below in which the percent gelation is indicated in terms of the volume of gelled portion to the total volume of each test sample.

TABLE.—PERCENT GELATION OF THE GELLED AGRICULTURAL AGENT

| Concentration of Formalin in the main ingredient | Concentration of gelling agent [1] to Formalin, percent | Percent gelation, percent by volume |
|---|---|---|
| 10 | 9.2 | 84 |
| 20 | 8.2 | 89 |
| 30 | 9.2 | 93 |
| 37 | 13.0 | 100 |

[1] Dibenzalsorbitol.

Each of the gelled chemicals as shown in table above was of agar-like semitransparent and, when it was stirred at high rate by means of a homomixer, exhibited the identical properties to those obtained in the foregoing examples.

EXAMPLE 4

This example illustrates an improvement on the use and handling of methyl bromide by gelation. Methyl bromide is characterized in that it can be used even at a relatively low temperature. Because of its low boiling point, the efficacy of the agent can be expected if the temperature of the ground where methyl bromide is used is above 4° C. This characteristic, on the other hand, increases the danger, so that great carefulness is required in using and handling methyl bromide.

A 20% solution of dibenzalsorbitol or a derivative thereof in DMF was poured or dropped in an amount of 4 to 7% into methyl bromide or a methyl bromide solution diluted, for example, with ethylene glycol monoethyl ether or an organic solvent having a high boiling point such as an aromatic toluene, xylene or higher alcohols thereby the methyl bromide solidified immediately. The resulting gelled preparation was easy to use and handle and showed that the volatilization of methyl bromide is decreased by approximately ⅔ to ¾ and that the efficacy is sustained about 5 times that of the untreated methyl bromide. When the preparation which showed 100% gelation was aged for 5 to 24 hours by cooling, the preparation exhibited the same physical property as that obtained in Example 3.

EXAMPLE 5

Propylene oxide (liquid having a boiling point of 35° C.) and solutions thereof diluted with an organic solvent, for example, xylene, ethylene glycol monoethyl ether or the like were solidified by the following manner: Propylene oxide and solutions thereof in the organic solvent as specified above having various concentrations were prepared, and a solution of the gelling agent was added thereto in an amount of 3 to 7% w./w. The gelation occurred instantaneously or otherwise gradually. The results were as shown below.

| Propylene oxide, wt. percent | Concentration of gelling agent, wt. percent | Organic solvent for dilution | Percent gelation by volume |
|---|---|---|---|
| 20.0 | 3.0 | Xylene | 99.8 |
|  |  | EGME* | 99.3 |
| 40.0 | 3.5 | Xylene | 98.2 |
|  |  | EGME | 98.5 |
| 60.0 | 4.0 | Xylene | 99.0 |
|  |  | EGME | 99.2 |
| 80.0 | 5.0 |  | 99.8 |

* Ethylene glycol monoethyl ether.

In the above gelled preparations having various concentrations of propylene oxide, the evaporating rate of the propylene oxide and the hardness of the preparations can freely be adjusted as shown in the foregoing examples.

EXAMPLE 6

The germicidal and insecticidal effect of ethylene oxide is significantly superior to that of propylene oxide when used as agricultural chemicals. However, because of the unique physical properties of ethylene oxide, it provides various problems in its use, handling and toxicity etc. It appears that, if ethylene oxide is gelled or solidified, the most of the problems will be dissolved. The following procedure illustrates the gelation of ethylene oxide.

Ethylene oxide and solutions thereof in an organic solvent such as xylene or ethylene glycol monoethyl ether having various concentrations were prepared, and a concentrated solution of the gelling agent was poured or dropped thereinto in an amount of 4 to 7% of the gelling agent. The gelation occurred instantaneously or otherwise gradually according to the conditions employed. In this case, it was also possible to adjust the hardness of the gelled preparation and the evaporation rate of ethylene oxide from the gelled preparation, etc. The results obtained were as shown in table below.

| Ethylene oxide, wt. percent | Concentration of gelling agent, wt. percent | Organic solvent for dilution | Percent gelation by volume |
|---|---|---|---|
| 20.0 | 5.0 | Xylene | 99.8 |
| 40.0 | 5.5 | EGME* | 99.1 |
| 60.0 | 7.0 | Xylene | 99.5 |
| 80.0 | 7.0 | | 99.7 |

* Ethylene glycol monoethyl ether.

EXAMPLE 7

The liquid organic agricultural chemicals, for example, D-D agent, VATAM, NCS, NET, EDB, etc., other than those used in the foregoing examples are also used as a potent nematocide or germicide in earth or a herbicide. However, because they are liquid and moreover highly volatile, irritative and toxic for human being, careful attention should be paid for the safety in their handling, in particular, impregnation into the earth.

This example illustrates the improvement on these preparations from the stand point of safety by solidifying the above agricultural chemicals thereby reducing and altering the fluid property so that the resulting preparation may exhibit semi-solid properties.

The solidification was effected in the same manner as described above by pouring or dropping a solution of dibenzal-D-sorbitol or a derivative thereof in the predetermined amount into the agricultural chemicals to be solidified or a solution thereof in an organic diluent thereby solidifying said chemicals instantaneously or otherwise gradually. Upon solidification (95 to 100% gelation), the resulting preparations were aged by allowing to stand for 5 to 24 hours at normal temperature or forcing to cool to a temperature from normal temperature to −10° C. followed by allowing to stand for 5 to 10 hours. The properties, in particular, physical and mechanical properties of the resulting gelled preparations were the same as those shown in the foregoing examples.

TEST RESULTS ON GELATION OF VARIOUS AGRICULTURAL CHEMICALS

| Agricultural chemicals | Concentration of gelling agent in the solution, w./w. percent | Solvent for dilution | Concentration thereof | Concentration of gelling agent | Main ingredient of chemicals |
|---|---|---|---|---|---|
| D-D | 35.0 | | 0.0 | 5.5 | Dichloropropene. |
| | | EC | 30.3 | 6.3 | Dichloropropane. |
| | | XYL | 20.3 | 4.5 | |
| VATAM NCS | 35.0 | | 0.0 | 7.0 | Sodium N-methyl-carbamate. |
| | 20.0 | XYL | 30.4 | 7.3 | Ammonium N-methyl-carbamate. |
| | | MeOH | 10.1 | | |
| NET | | | 0.0 | 7.0 | Tricholornitroethylene. |
| | 35.0 | TOL | 20.0 | | Dichlorodinitromethane. |
| | | XYL | 10.2 | 7.2 | 1,1,2,2-tetrachloronitroethane. |
| | 25.0 | TOL | 20.1 | 5.0 | |
| | | BuOH | 10.0 | | |
| EDB | 35.0 | | 0.0 | 7.1 | Ethyldibromide (1,1–). |
| | | MeOH | 10.0 | | |
| | 30.0 | TOL | 5.8 | 6.8 | |
| | | XYL | 5.9 | | |
| | 35.0 | EC | 30.5 | 5.9 | |

Note: EC=Ethylene glycol monoethyl ether; XYL=Xylol; MeOH=Methanol; BuOH=n-butanol.

What is claimed is:

1. An agricultural chemical composition in the form of a solid or jelly consisting essentially of a first component selected from the group consisting of liquid organic agricultural chemicals and liquid solutions of solid organic agricultural chemicals, and a second component selected from the group consisting of dibenzalsorbitol, monobenzalsorbitol and tribenzalsorbitol, the amount of said second component being sufficiently to solidify or jellify said first component.

References Cited

UNITED STATES PATENTS

| | | | |
|---|---|---|---|
| 3,418,238 | 12/1968 | Wilson | 252—1 |
| 1,280,602 | 10/1918 | Wells | 424—350 X |
| 1,936,093 | 11/1933 | Lawson | 260—611 |
| 2,798,100 | 7/1957 | Linn | 252—316 X |
| 3,318,769 | 5/1967 | Folckemer et al. | 424—219 X |
| 3,337,399 | 8/1967 | Dawson | 424—350 |

RICHARD D. LOVERING, Primary Examiner

U.S. Cl. X.R.

71—3; 252—316; 424—219, 286, 334, 339, 349, 350, 351